United States Patent

[11] 3,581,074

[72] Inventor Richard B. Waltz
King of Prussia, Pa.
[21] Appl. No. 706,268
[22] Filed Feb. 19, 1968
[45] Patented May 25, 1971
[73] Assignee Burroughs Corporation
Detroit, Mich.

[54] AUTOMATIC CHECKOUT APPARATUS
9 Claims, 4 Drawing Figs.

[52] U.S. Cl. .......... 235/153, 324/73
[51] Int. Cl. .......... G01f 31/30, G06f 11/04
[50] Field of Search .......... 324/73; 235/153

[56] References Cited

UNITED STATES PATENTS 3,302,109 1/1967 Jones .......... 324/73
3,032,191 5/1962 Clukey .......... 324/73X

OTHER REFERENCES

King, L. E. et al. Channel Modification for Fault Location Tests In IBM Tech. Disc. Bull. 8(1): pg. 72 June 1965.

*Primary Examiner*—Malcolm A. Morrison
*Assistant Examiner*—R. Stephen Dildine, Jr.
*Attorney*—Carl Fissell, Jr.

ABSTRACT: Apparatus for operationally testing a computer component (i.e. a subsystem of a data processing system) which apparatus includes a memory for storing sets of enable signals to be transmitted to the computer component under test, and means for transmitting the enable signals to the computer component for causing it to perform operations on data. Also included are register means for storing a data word for transmission to a selectable portion of the computer component at a selectable time during a test, register means for receiving a data word from a selectable portion of the computer component for comparison with an expected value and stepper control logic for controlling the operation of the apparatus. The sets of enable signals to be sent to the computer component, control words for controlling the operation of the apparatus and data words for said register means are fed into an input buffer register from punched tape or a card deck for distribution to the proper parts of the apparatus.

INVENTOR.
RICHARD B. WALTZ

BY [signature]

ATTORNEY

PATENTED MAY 25 1971 3,581,074

SHEET 2 OF 3

INVENTOR.
RICHARD B. WALTZ

BY [signature]

ATTORNEY

INVENTOR.
RICHARD B. WALTZ
BY Kevin C. McMahon
ATTORNEY

AUTOMATIC CHECKOUT APPARATUS

BACKGROUND OF THE INVENTION

This invention relates generally to automatic checkout apparatus and more particularly to automatic apparatus for operationally testing a component, or subsystem, of a data processing system.

Independent components in data processing systems are often designed and built by separate groups of engineers who operate under different work schedules and whose knowledge of other components is limited to the interfaces that they have with their component. In these situations groups working on one component, such as a processing element in an array computer, may have prototypes and even final production models fabricated while other components having extensive interfaces with it, are still in the design phase. Unless some means for simulating the other components are available, it is impossible to test the design of a prototype or production model in an environment similar to actual working conditions until all of the components are completed. As a result of the inadequacy of other available types of testing, significant design errors may go undiscovered until the entire system is assembled and substantial time and money may be wasted.

In the usual run of things a data processing system is delivered to the customer in a piecemeal fashion. It is far more efficient and less costly for him to be able to perform acceptance tests on each component separately as it comes in instead of being required to wait for the entire system to arrive and be assembled. In order to be able to do this, the customer must also have some means for simulating the other components. Such a simulator is also very useful during maintenance to test the operation of a component without having to tie up the entire system.

It is therefore an object of this invention to provide apparatus for simulating the interfaces of a component of a data processing system with other components of the system during operational testing of the component.

It is a further object of this invention to provide automatic checkout apparatus for a component of a data processing system which simulates the proper inputs for the operation of the component.

It is a further object of this invention to provide automatic apparatus for operationally testing a component of a data processing system by simulating the proper data and control inputs to the component for performing the various operations which the component is designed to perform.

In carrying out these and other objects of this invention there is provided automatic checkout apparatus for operationally testing a component of a data processing system which apparatus includes memory means for storing a plurality of sets of enable signals and memory control means for transmitting said sets of enable signals in a set by set fashion to said component under test for enabling the desired portions of said component in the desired order. Also included are means for transmitting a data word to a selected portion of said component at a selected time during the running of the test, means for receiving a data word from a selected portion of said component and for comparing said received data word with an expected value, and stepper control means for initializing said memory control means and said data word transmitting means and receiving means and for initiating the next operation of the apparatus after a test is completed. Instructions and initial condition signals for said apparatus enable signals for storage in said memory means and data words for said transmitting means and said receiving means are read from information input means by reader control means.

BRIEF DESCRIPTION OF THE DRAWINGS

Various other objects, advantages and features of the invention will become more fully apparent in the following specification with its appended claims and accompanying drawings, in which:

DETAILED DESCRIPTION

This invention can best be understood by referring to the following detailed description of the illustrated embodiment.

Figure 1:
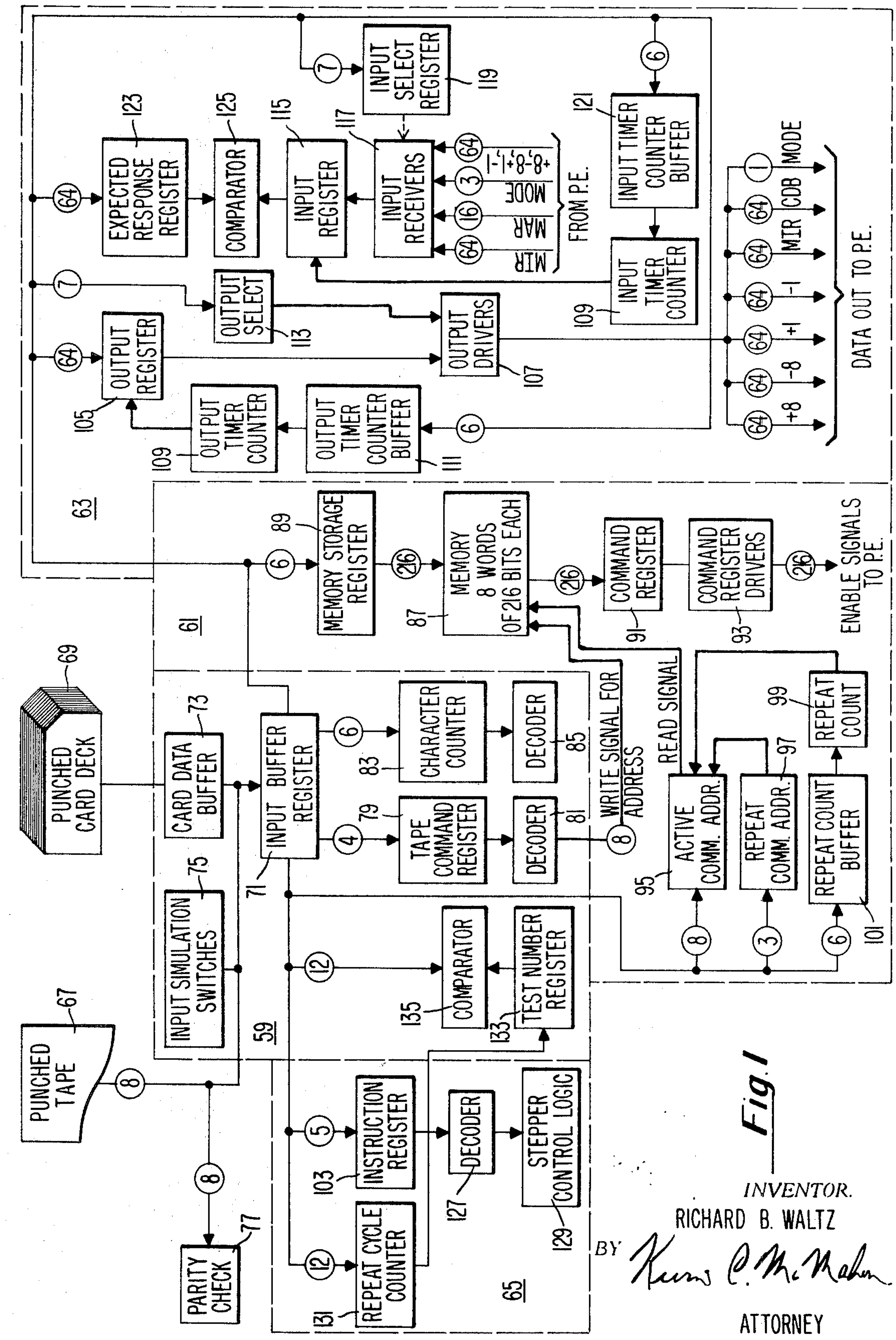
FIG. 1 is a block diagram of a system embodying the invention.

The illustrated embodiment of the invention shown in FIG. 1 of the drawings is particularly useful in testing a processing element of an array computer such as that set out in the U.S. Pat. application Ser. No. 692,186, filed Dec. 20, 1967 by Richard A. Stokes et al., and assigned to the assignee of the present invention. In order to assist in the understanding of the use of the invention, a description of the processing element of the above-mentioned patent application is given. A more detailed description may be found in the above application.

Figure 2:
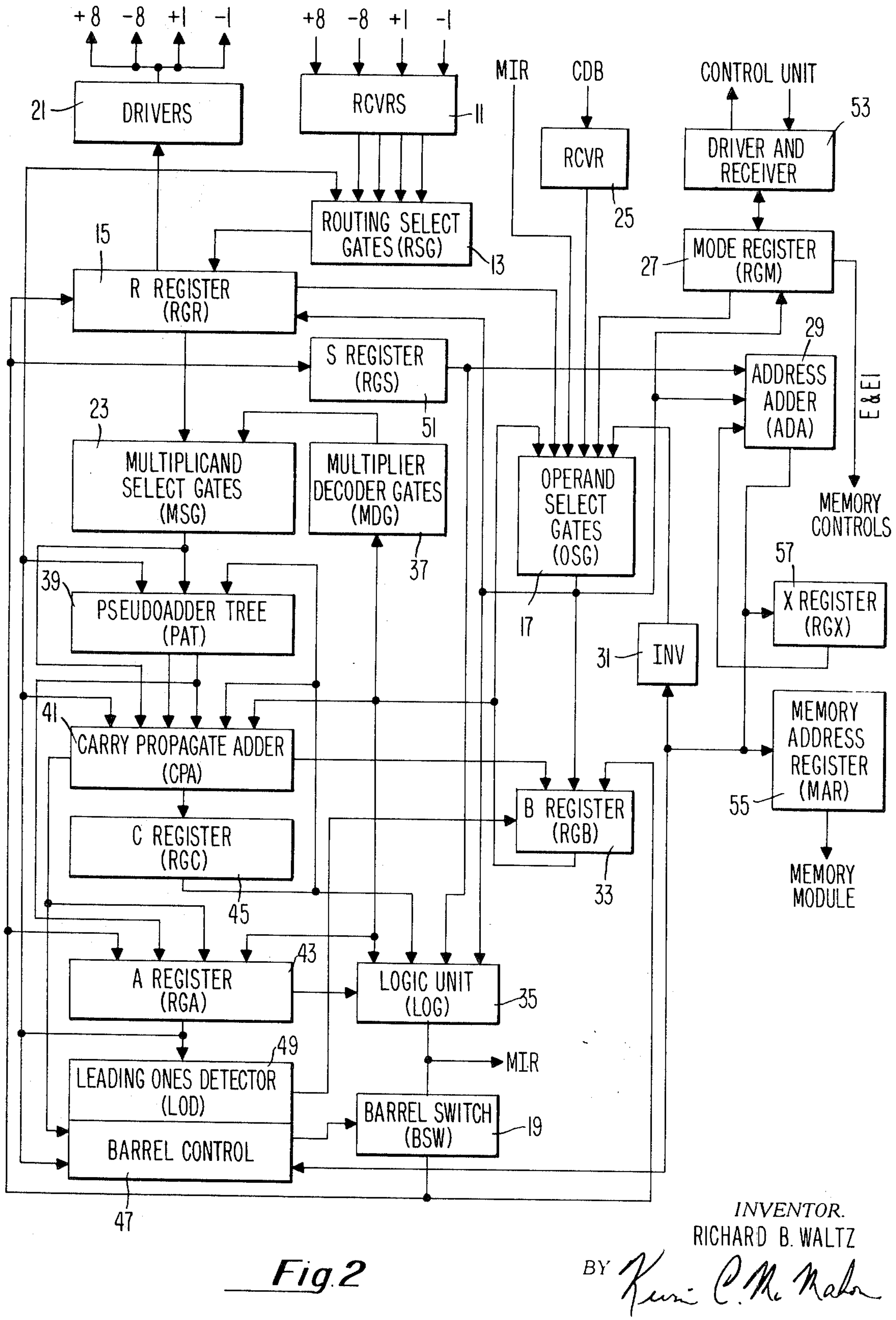
FIG. 2 is a block diagram of a processing element of an array computer system which may be operationally tested by the apparatus of FIG. 1.

Referring to FIG. 2 of the drawings, each processing element (PE) is essentially a general purpose computer having the control logic removed. Each PE contains arithmetic and logic circuitry for performing operations on data at the direction of a Control Unit (CU) and each has associated with it a Processing Element Memory (PEM) which acts both as a memory for the PE and as a portion of the memory of the CU.

The PE receives data from its +8, −8, +1 and −1 neighbors through four sets of 64-bit wide receivers 11 of which are connected through the Routing Select Gates (RSG) 13 to the input of the R Register (RGR) 15. The RGR 15 is a 64-bit gated register which can also receive 64-bit parallel inputs from the Operand Select Gates (OSG) 17 or the Barrel Switch (BSW) 19. RGR 15 has outputs going to the Drivers 21 for routing data to other PE's to the OSG 17 and to the Multiplicand Select Gates (MSG) 23.

The OSG 17, which may be identical to the RSG 13, is a 64 bit wide set of gates which gate one of six inputs to its output. The inputs from the RGR 15, from the Memory Information Register (MIR) of the associated PEM, from the Common Data Bus (CDB) through a Receiver 25 from the Mode Register (RGM) 27, from the Address Adder (ADA) 21 through an inverter (INV) 31 and from the B Register (RGB) 33. Its output goes to the RGB 33, to RGR 15, to the Logic Unit (LOG) 35, to ADA 29 and to RGM 27.

The CDB is a path from the CU over which it broadcasts data to all of the PE's in parallel. The MSG 23 also receives a control input from the Multiplier Decoder Gates (MDG) 37. Its output goes to the Pseudo Adder Tree (PAT) 39 and the Carry Propagate Adder (CPA) 41. The MSG 23 is used in multiplication and division operations. The PAT 39 is formed of a series of cascaded 56-bit wide carry save adders and is also used in multiplication and division operations. Besides receiving input signals from the MSG 23, the PAT 39 also receives inputs from the A Register (RGA) 43 and from C Register (RGC) 45. The sum and carry outputs of the PAT 39 go to the Carry Propagate Adder (CPA) 41 which may act either as a carry save adder and thus be part of the PAT 39, or as a carry propagate adder whose output is the true sum of the inputs.

The CPA 41 is used in all arithmetic and most logic operations and receives inputs from the PAT 39, RGC 45, RGB 33, MSG 23 and RGA 43. The CPA 41 has outputs going to RGC 45, RGB 33, RGA 43 and to the Barrel Control 47. RGC 45 is an ungated register used to hold the carry output of the CPA 41 when it is acting as a carry save adder.

RGA 43 is a 64-bit gated register and may be structurally identical to RGR 15 and to RGB 33. RGA 43 has outputs going to LOG 35, to the Leading Ones Detector (LOD) 49, to CPA 41, to the PAT 39, and to RSG 13. RGA 43 acts as an accumulator during arithmetic and logical operations with a combination of RGA 43, RGB 33 and RGR 15 holding the operands to be operated upon.

The LOD 49 is used for normalizing the numbers in RGA 43 by shifting them in the BSW 19. The LOD 49 is closely connected with the Barrel Control 47 for controlling the operation of the Barrel Switch (BSW) 19. The output of the LOD also goes to the RGB 33 and the OSG 17, has inputs from RGA 43, from RGB 33, from RGC 45, from RGS 51 and from OSG 17. The output of LOG 35 gotes to the BSW 19 and to the Memory Information Register (MIR) of the associated PEM.

The BSW 19 is used for shifting operands any desired number of places either to the left or right, end around or end off. It has inputs from the LOG 35 and the Barrel Control 47 and its output goes to RGB 33, RGA 43, RGS 51 and RGR 15. The operation of the BSW 19 is controlled by the Barrel Control 47.

RGB has inputs from the OSG 17, the CPA 41 and the BSW 19 and is used to hold operands during arithmetic operations. It may be identical in structure to RGR 15 and RGA 43 and its output goes to the OSG 17, the CPA 41, the MDG 37, RGA 43 and LOG 35.

The Mode Register (RGM) 27 is eight bits wide in this embodiment of the invention and contains various enable, fault and test bits. RGM 27 communicates with the CU on a one bit wide path through a Driver and Receiver 53. RGM also may be loaded or read in parallel by the OSG 17 and transmitted to the E and $E_1$ bits to the Memory Controls.

The Memory Address Register (MAR) 55 holds the address of the location in the PEM which is being addressed by the PE, the CU or the I/O. In this particular embodiment of the invention the memory address is 11 bits long. The MAR 55 is 16 bits long to accommodate overflow in the memory addresses. Addresses are inserted into the MAR 55 from the ADA 29 which has inputs from the OSG 17, from RGS 51, and from the X Register (RGX) 57. The memory address is inserted into the ADA 29 by the CU through the OSG 17. The address can then be inserted directly into the MAR 55 or it can be incremented by the contents of RGX 57 or RGS 51 before being inserted into MAR 55.

Referring now to FIG. 1 of the drawings, the automatic checkout apparatus of this invention may be divided into four sections: a Reader Control Unit 59, a Memory Unit 61, a Data Word I/O Unit 63 and a Stepper Control Unit 65.

The Reader Control Unit 59 reads data presented at its input until it reaches the information for the test which is to be performed next. After determining proper test information is present, the Reader Control Unit 59 distributes from the information input means the initial conditions and instructions for the apparatus and sets of enable signals and data words for the PE under test to the other parts of the system. The information input means in the illustrated embodiment of the invention may be either a Punch Tape Reader 67 or a Punched Card Deck Reader 69.

The Memory Unit 61 stores the sets of enable signals received from the input means through the Reader Control Unit 59 and transmits these sets of enable signals in a set by set fashion to the PE under test when initiated by the Stepper Control Unit 65.

The Data Word I/O Unit 63 stores a data word received from the Reader Control Unit 59 and transmits it to a selected portion of the PE at a selected time during the test. The I/O Unit 63 also receives a data word from a selected portion of the PE under test at a selected time during the test and compares this word with an expected value. This expected value is received by the I/O Unit 63 from the Reader Control Unit 59.

The Stepper Control Unit 65 initiates the operation of the Memory Unit 61 and the Data Word I/O Unit 63 after the necessary information for running the test has been distributed by the Reader Control Unit 59. When the last set of enable signals is transmitted to the PE under test by the Memory Unit 61, the Memory Unit 61 sends a signal to the Stepper Control Unit 65. The Stepper Control Unit 65 then determines the next operation to be performed in accordance with a 5-bit instruction which is received from the Reader Control Unit 59 at the beginning of the test.

The portions of the apparatus of this invention which interface with the PE operate at a fast clock frequency equal to the PE's clock frequency which for the PE being discussed is on the order of 25 MHz. In order to simplify the design requirements for the rest of the system, and because of limitations in the speed of the tape or card deck inputs used in the illustrated embodiment of the invention, the rest of the system operates at a slower clock rate which may be one-sixteenth of the fast clock frequency or 1.56 MHz.

The sets of enable signals stored in the Memory Unit 61 are transmitted to the PE under test for causing it to perform mathematical or logic operations on the contents of its registers. Such operations as Add, Multiply, OR, AND, memory fetching and storing and operations on the mode bits may be simulated with the apparatus of this invention.

Figure 3:
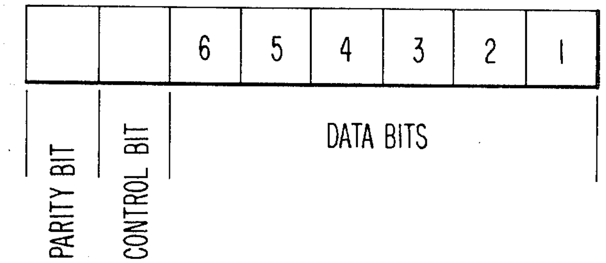
FIG. 3 shows the format of the 8-bit character used to write information into the system for running a test.

Turning now to a more detailed description of the structure and operation of the system in relation to FIG. 1 of the drawings, 8-bit characters containing test information are fed into the Input Buffer Register 71 of the Reader Control Unit 59 portion of the system from the Punched Card Deck Reader 69 through a Card Data Buffer 73 or from the Punched Tape Reader 67. The information is received from the tape or the cards in the form of 8-bit characters having the format shown in FIG. 3 of the drawings. Each character consists of six data bits, a control bit and a parity bit. Characters may also be written into the system manually from the Control Panel (not shown) by means of the Input Simulation Switches.

In the illustrated embodiment of the invention the information on the cards appears in 12-bit columns which are coded decimally. Bits zero through seven have their decimal significance and bit 11 is used for the control bit. Bits eight, nine and 10 are not used. Bits zero through seven are translated into binary in the Card Deck Buffer 73. Two columns are used to form each character with the first being used to form the first three data bits and the second being used to form the second three data bits of the character.

Parity is checked in the Parity Checker 77 for characters read by the Tape Reader 67. It is not checked for characters from the Punched Card Deck Reader 69.

The characters occur in series with the first character of any series being a Tape Command which indicates the significance of the information contained in the characters of the series. The Tape Command is characterized by having its control bit equal to "1." Four of the data bits of a Tape Command contain an operation code which tells the Reader Control Unit 59 either to store the information contained in the data bits of the characters of the series in particular parts of the system or to start the test. The other two data bits of the Tape Command are not used.

Each character read from the tape or the card deck is inserted into the Input Buffer Register 71 and if it is a Tape Command, i.e., if the control bit is equal to "1," the four bits that contain the operation code are inserted into the Tape Command Register 79. Once in the Tape Command Register 79 the operation code is decoded in the Decoder 81.

The next character received after a Tape Command is always a Character Count which designates in its 6-bit data field the number of characters that are included in the series following the Tape Command. These six bits are transferred to the Character Counter 83 over a 6-bit wide path from the Input Buffer Register 71. The Character Counter 83 is a 6-bit wide downcounter operating at the slow clock rate whose output is decoded in the Decoder 85 for controlling the distribution of subsequent characters of the series in cooperation with the Decoder 81.

The Memory 87 stores sets of enable signals which are to be transmitted to the PE under test for enabling the desired portions of the PE in the proper sequence to perform the particular test being run. In the illustrated embodiment of the invention the Memory 87 contains eight words, or sets of enable signals, of 216 bits each, each bit being an enable signal to one portion of the PE. Words are nondestructively read from Memory 87 at the fast clock rate. In order to achieve this reading speed economically, two four-word memories may be used with words being read from them alternately.

The sets of enable signals to be written into the Memory 87 from the Input Buffer Register 71 are loaded into the 216-bit wide Memory Storage Register 89 six bits at a time. When the Memory Storage Register 89 is full, the set of enable signals is loaded into the proper place in the Memory 87 over a 216-bit wide path. The location into which the set of enable signals is written in the Memory 87 is determined by a combination address selection and write signal from the Decoder 81. There may be one line from the Decoder 81 for each of the eight word addresses in the Memory 87.

In order to transmit sets of enable signals from the Memory 87 to the PE under test, the set is first read from the Memory 87 and transferred to the Command Register 91. From there it is transmitted to the PE through the Command Register Drivers 93. The location in the Memory 87 being addressed during a read cycle is determined by the Memory Read Controls which are made up of the Active Command Address Register 95, the Repeat Command Register 97, the Repeat Count Counter 99 and the Repeat Count Buffer 101. The initial conditions for the Memory Read Controls are set up at the beginning of each test from the Reader Control Unit 59.

The Active Command Address Register 95 is an 8-bit register in which each bit location corresponds to one of the words in the Memory 87. There may be eight read lines from the Active Command Address Register 95 to the Memory 87, one for each word.

Many of the operations to be performed by the PE's, such as multiplication, contain an iterative step. The other portions of the Memory Controls are provided in order that these steps may be handled with a minimum amount of hardware.

The Repeat Command Address Register 97 is a 3-bit register whose contents indicate the address in the Memory 87 the contents of which are to be repeated and the Repeat Count Counter 99 is a six bit down-counter whose contents indicate the number of times the transmission of the set of enable signals indicated in the Repeat Command Address Register 97 is to be repeated. The Active Command Address Register 95 also contains logic for controlling the memory and for decoding and processing the outputs of the Repeat Command Address Register 97 and the Repeat Count Counter 99.

In transmitting the sets of enable signals to the PE under test, the first bit of the Active Command Address Register 95 is examined, and if a one, a read signal is sent to the Memory 87 on a first fast clock pulse for reading out the set of enable signals in the first word address into the Command Register 91. The voltage levels of the Command Register 91 are modified by the Command Register Drivers 93 and are sensed by the PE as enable signals on the next PE clock pulse which occurs at the same frequency as the fast clock pulse.

On the second fast clock pulse the Repeat Command Address Register 97 is also examined to determine whether the first word is to be repeated. If it is, the Repeat Count Counter 99 starts down-counting at the fast clock rate and prevents any further reading of words from the Memory 87 until it counts down to zero. As a result of this, the contents of the Command Register 91 remain unchanged and the PE components are enabled in accordance with the set of enable signals in the Command Register 91 on each PE clock pulse until the Repeat Count Counter 99 has counted to zero. In this way the particular set of enable signals may be repeated up to 64 times.

After the Counter 99 has counted down to zero, the next bit of the Active Command Address Register 95 is examined, and if it is a one, the set of enable signals in the next word location in Memory 87 is transferred to the Command Register 91 to be sensed by the PE's as enable signals on the following PE clock pulse.

The Repeat Command Address Register 97 is examined on each set of enable signals transferred to the Command Register 91. In the illustrated embodiment of this invention its contents are not changed during the running of a test so that at most, one address can be repeated. The next bit in the Active Command Address Register 95 is examined after each word is read from the Memory 87 and if a one, the corresponding word in the Memory 87 is read out into the Command Register 91. The sensing of a zero in the Active Command Address Register 95 indicates that no further sets of enable signals are to be transferred to the PE for the particular test and a signal is sent to the Stepper Control Unit 65 to have it perform the instruction specified in the Instruction Register 103.

The performance of some mathematical or logical operations by the PE under test may require more than eight different sets of enable signals to be transmitted from the Memory 87. In order to perform such operations it is necessary to break them up into two or more tests and to run the parts consecutively.

The Output Register 105 contains a 64-bit data word to be transmitted to a selected portion of the PE under test through the Output Drivers 107 at a time after the beginning of the test determined by the Output Timer Counter 109. The Output Timer Counter 109 is loaded from the Output Timer Counter Buffer 111 at the beginning of a test under the control of the Stepper Control Unit 65. The destination of the data word is determined by the Output Select Register 113 which is a 7-bit register whose bit locations correspond to seven possible destinations of the data indicated in FIG. 1. The particular output select bit which is set enables the corresponding output path of the Output Drivers 107.

The 64-bit Input Register 115 receives a 64-bit data word from one of four locations in the PE during the running of a test through the Input Receivers 117. The particular input path which is enabled is determined by the contents of the Input Select Register 119 which is loaded from the Input Buffer Register 71 of the Reader Control Unit 59 at the beginning of the test sequence. The time at which the Input Register 115 reads the data word from the selected portion of the PE is determined by the Input Timer Counter 109 which is a 6-bit down-counter loaded from the Input Timer Counter Buffer 21 at the beginning of the running of a test under the control of the Stepper Control Unit 65. After the Input Register 115 receives the data word from the PE it compares it with an expected value contained in the Expected Response Register 123 by means of the Comparator 125.

The Stepper Control Unit 65 includes a 5-bit Instruction Register 103 whose contents specify the operation to be performed by the Stepper Control Unit 65 after the Memory 87 is finished transmitting the sets of enable signals to the PE under test. The contents of the Instruction Register 103 are decoded in the Decoder 127 and transferred to the Stepper Control Logic 129 for causing it to perform the specified operation.

The Stepper Control Logic 129 is divided into two portions: an initialization portion and a portion for executing the instruction in the Instruction Register 103.

The initialization portion initializes the Memory Unit 61 and the I/O 63 upon receipt of the START command by the Reader Control Unit 59 for causing the transfer of the input and output counts to their respective Timing Counters from the Input and Output Timer Counter Buffers 121 and 111 and the transfer of the Repeat Count to the Repeat Count Counter 99 from the Repeat Count Counter Buffer 101. The Repeat Count Counter 99 does not begin down-counting until an enable signal is received from the Active Command Address Register 95 when the address to be repeated is reached.

The Repeat Cycle Counter 131 is a 12-bit down-counter which specifies the number of times a particular test is to be repeated. It can also be used to hold a new Test Number to be inserted into the Test Number Register 133 at the end of a test.

In the illustrated embodiment of the invention there are 13 different types of Tape Commands each characterized by having a "one" in the control bit location. The operation code for each of these commands is contained in four of the six data bit positions according to the following table:

TABLE I.—OPERATION CODES

| Code | Reader command | Data destination |
|---|---|---|
| 01 | System Instruction | Instruction Register 103. |
| 02 | Expected Response | Expected Response Register 123. |
| 03 | OUTPUT STORE | Output Register 105. |
| 06 | START | Control Signal. |
| 10 | MEMORY DATA | Address 0. |
| 11 | do | Address 1. |
| 12 | do | Address 2. |
| 13 | do | Address 3. |
| 14 | do | Address 4. |
| 15 | do | Address 5. |
| 16 | do | Address 6. |
| 17 | do | Address 7. |
| 20 | TAPE STOP | Halts the forward motion of the tape. |

The System Instruction, which is characterized by an operation code of 0001 is the first Tape Command received by the Reader Control Unit 59 at the beginning of any test. The characters following the System Instruction contain the initial conditions which are inserted into the various registers of the system in order to set them up for the running of a test, as will be explained later on in more detail. The System Instruction Tape Command and the data characters associated with it have the following format:

TABLE II.—SYSTEM INSTRUCTION COMMAND

| 8 | 7 | 6 | 5 | 4 | 3 | 2 | 1 | Tape Channels. |
|---|---|---|---|---|---|---|---|---|
| 1 | 1 | 0 | 0 | 0 | 0 | 0 | 1 | System instruction Tape command. |
| 0 | 0 | 0 | 0 | 1 | 0 | 1 | 0 | Character count. |
| X | 0 | (TN) | (TN) | (TN) | (TN) | (TN) | (TN) | |
| X | 0 | (TN) | (TN) | (TN) | (TN) | (TN) | (TN) | |
| X | 0 | (I) | (I) | (I) | (I) | (I) | (I) | |
| X | 0 | (IS) | (IS) | (IS) | (IS) | (IS) | (IS) | |
| X | 0 | (OS) | (OS) | (OS) | (OS) | (OS) | (OS) | |
| X | 0 | (OS) | (B) | (B) | (B) | (B) | (B) | |
| X | 0 | (B) | (B) | (B) | (B) | (B) | (B) | |
| X | 0 | (B) | (IT) | (IT) | (IT) | (IT) | (IT) | |
| X | 0 | (IT) | (OT) | (O)T | (OT) | (OT) | (OT) | |
| X | 0 | (OT) | (AC) | (AC) | (AC) | (AC) | (AC) | |
| X | 0 | (AC) | (AC) | (AC) | (RC) | (RC) | (RC) | |
| X | 0 | (CC) | (CC) | (CC) | (CC) | (CC) | (CC) | |

Bit Designation:
- TN=Test Number
- I=Instruction Code
- IS=Input Select
- OS=Output Select
- B=Branch Test Number or a Repeat Cycle Count
- IT=Input Timer Count
- OT=Output Timer Count
- AC=Active Memory Commands
- RC=Repeat Command Address
- CC=Repeat Command Count Destination:
- Comparator=135
- Instruction Register=103
- Input Select Register=119
- Output Select Register=113
- Repeat Cycle Counter=131
- Input Timer Counter Buffer=121
- Output Timer Counter Buffer=111
- Active Command Address Register=95
- Repeat Command Address Register=97
- Repeat Count Buffer=101.

In operation the Input Buffer Register 71 senses characters being read from the tape or card deck until it senses a character having a "one" in the control bit position, thereby indicating that the character is a Tape Command. When a Tape Command is sensed the four data bits containing the operation code are transferred to the Tape Command Register 79 to determine whether the Tape Command is a System Instruction. If the Tape Command is not a System Instruction, the Reader Control Unit 59 continues reading the tape or punch cards until it finds a System Instruction Tape Command. Having loaded a System Instruction into the Tape Command Register 79 the next character which is a Character Count is transferred from the Input Buffer Register 71 to the Character Counter 83. The data bits of the next two characters read into the Input Buffer Register 71 make up the Test Number which is compared in the Comparator 135 to the number of the next test to be performed which is contained in the Test Number Register 133.

If the Test Number read from the input is less than the number in the Test Number Register 133 of the next test to be performed, the Reader Control Unit 59 begins reading again until it reaches the next System Instruction Tape Command. If the Test Number read from the input is larger than the number in the Test Number Register 133 a signal is sent to the Control Panel (not shown) indicating that it is necessary to rewind the tape.

If the Test Number read from the input is equal to the number in the Test Number Register 133, Decoders 81 and 85 operate to distribute the data bits of the next 10 characters to the various registers of the system in accordance with Table II.

When the Character Counter 83 has counted down to zero, the data transfer for the command in the Tape Command Register 79 is terminated and the Reader Control Unit 59 looks for the next Tape Command. After the information associated with a System Instruction has been loaded into the registers of the apparatus other Tape Commands may be sensed. In the illustrated embodiment of the invention the next Tape Commands to be sensed are for loading up to eight words of enable signals into the Memory 87. As indicated in Table I, there is one command for each word. In tests requiring fewer than eight sets of enable signals to run the test, some of the memory word locations are left empty.

In the case of a Tape Command for loading a word into the Memory 87, a count of 36 is loaded into the Character Counter 83. The data bits of the following 36 characters are loaded into the Memory Storage Register 89, six bits at a time, under the control of the Tape Command Register 79 and the Character Counter 83. When the Character Counter 83 has counted down to zero, the Decoder 81 sends a write signal to the proper address of the Memory 87 for writing in the word from the Memory Storage Register 89.

After the Memory 87 is loaded with the sets of enable signals for running the test, the next Tape Commands to be read are for loading the 64-bit Output Register 105 and Expected Response Register 123. Although these registers are shown in FIG. 1 as being separate components, they may physically be part of the Memory Storage Register 89. The Tape Commands for loading these registers have operation codes equal to 03 and 02, respectively. The Character Count for each of these types of instructions are equal to 11 with only four bits of the last character being used.

The next Tape Command sensed by the Input Buffer Register 71 in the running of a test is the START command which has an operation code equal to 06. The receipt of the START command causes the Reader Control Unit 59 to stop the reading of the tape or punch cards and to send a signal to the Stepper Control Logic 129 for beginning the test.

Upon receiving the signal from the Reader Control Unit 59 the initialization portion of the Stepper Control Logic 129 generates an initialization signal to the Output Timer Counter Buffer 111 and the Input Timer Counter Buffer 121 which gates their contents into the respective Timer Counters. The Stepper Control Logic 129 also generates an initialization signal to the Active Command Address Register 95 to begin the reading of the sets of enable signals from the Memory into the Command Register and to the Repeat Count Buffer 101 to gate the count into the Repeat Count Counter 99. Signals are also sent by the Stepper Control Logic 127 to the Output and Input Select Registers 113 and 119 for enabling them to select the proper output and input paths for data.

After being initialized by the Stepper Control Logic 129, the Memory 87 sends the sets of enable signals to the PE under test at the fast clock rate. If the test contains an iterative step, one of the sets of enable signals is repeated the desired number of times as explained earlier.

When the Output Timer Counter 109 counts down to zero, it enables the Output Register 105 to transmit the 64-bit data word through the Output Drivers 107 to the output path selected by the Output Select Register 113.

When the Input Timer Counter 109 counts down to zero, it enables the Input Register 115 to read a data word through the Input Receivers 47 from the input path determined by the Input Select Register 119. The data word received by the Input Register 115 is compared with the contents of the Expected Response Register 123 in the Comparator 125. If the two data words are not equal, an error signal is generated which may halt the apparatus at the end of the test or give an error indication on the Control Panel, depending on the contents of the Instruction Register 103.

When the Memory 87 has transmitted the last set of enable signals to the PE under test, the Active Command Address Register 95 sends a signal to the Stepper Control Logic 129 for enabling it to execute the instruction contained in the Instruction Register 103.

The 5-bit instruction contained in the Instruction Register 103 specifies the operation to be performed by the system at the end of the test under execution. In the illustrated embodiment of the invention there are six basic operations which may be performed by the Stepper Control Unit 65, and the instructions may specify any one or a combination of them.

The six basic operations are:

| | |
|---|---|
| BRANCH | Transfers the contents of the Repeat Cycle Counter 131 to the Test Number Register 133 and starts the Reader Control Unit 59 in search of a new System Instruction Tape Command. |
| COMPARE | Compares the contents of the Expected Response Register 123 and the Input Register 115. If the comparison fails, an error signal is indicated on the Control Panel. |
| STORE | Transfers the contents of the Input Register 115 to the Output Register 105. |
| HALT | Stops the apparatus. The PROCEED button must be pushed on the Control Panel to restart it. |
| REPEAT | Re-executes the test just performed. This instruction can be either "on condition" in which case the test is continuously repeated until the PROCEED button is pushed on the Control Panel or "on count" in which case, if the Repeat Cycle Counter 131 contents are not zero, they are decremented by one and the test is repeated, If the contents of the Repeat Cycle Counter 131 are zero, the Test Number Register 123 is incremented by one and the Reader Control Unit 59 is started looking for a new System Instruction Tape Command. |
| CONTINUE | Increments the Test Number Register 133 by one and starts the Reader Control Unit 59 looking for a new System Instruction Tape Command. |

Two or more of these operations may be combined by the instruction in the Instruction Register 103 such as COMPARE/BRANCH or COMPARE/HALT instructions in which the BRANCH or HALT instruction is executed if the comparison fails. If the comparison yields equality the Test Number Register 133 is incremented by one and the Reader Control Unit 59 is started.

The instruction repertoire for the Instruction Register 103 in a particular application depends upon what capabilities the user wishes to have designed into the Stepper Control Logic 129.

The execution of the 5-bit instruction is accomplished in two levels, each taking one slow clock interval. The first level of execution is initiated by the signal from the Active Command Address Register 95. During this first interval, the Test Number Register 133 is cleared if the Instruction Register 103 contains a BRANCH instruction or the COMPARE/BRANCH instruction is specified and the expected response comparison fails to yield equality. Also the contents of the Input Register 115 are transferred to the Output Register during this interval if a STORE/HALT instruction is specified.

The second level of execution of the instruction is performed during the second clock interval if any one of the following three conditions are fulfilled: (1) if a HALT instruction is not specified in the Instruction Register 103, (2) if a HALT instruction is specified in the Instruction Register 103 but the conditions for a halt are not met; or (3) if the PROCEED button is pushed on the Control Panel. The second level of execution is not performed if a HALT instruction operation is specified and the conditions for the halt are satisfied.

During the second level of execution the contents of the Repeat Cycle Counter 131 are transferred to the Test Number Register 133 if the Test Number Register 133 has been cleared during the first level of execution. In addition, the following operation may take place depending on the instruction in the Instruction Register 103: (1) transfer contents of the Input Register 115 to Output Register 105; (2) increment the Test Number Register 133 by one; (3) enter the initialization portion of the Stepper Control Logic 129, and decrement the Repeat Cycle Counter 131 by one if a REPEAT instruction is specified; (4) start the Reader Control Unit 59.

The Stepper Control Logic 129 increments the Test Number Register 133 at approximately the same time that it signals the Reader Control Unit 59 to start. Therefore, the Reader Control Unit 59 reads until it finds the information for the next test to be run in a sequence of tests.

There are two possible exit circuit paths from this portion of the Stepper Control Logic 124. The first is to the Reader Control Unit 59 when it is started in search of a new System Instruction Tape Command and the second is to the initialization portion of the Stepper Control Logic 129 when a REPEAT operation is to be performed.

Figure 4:
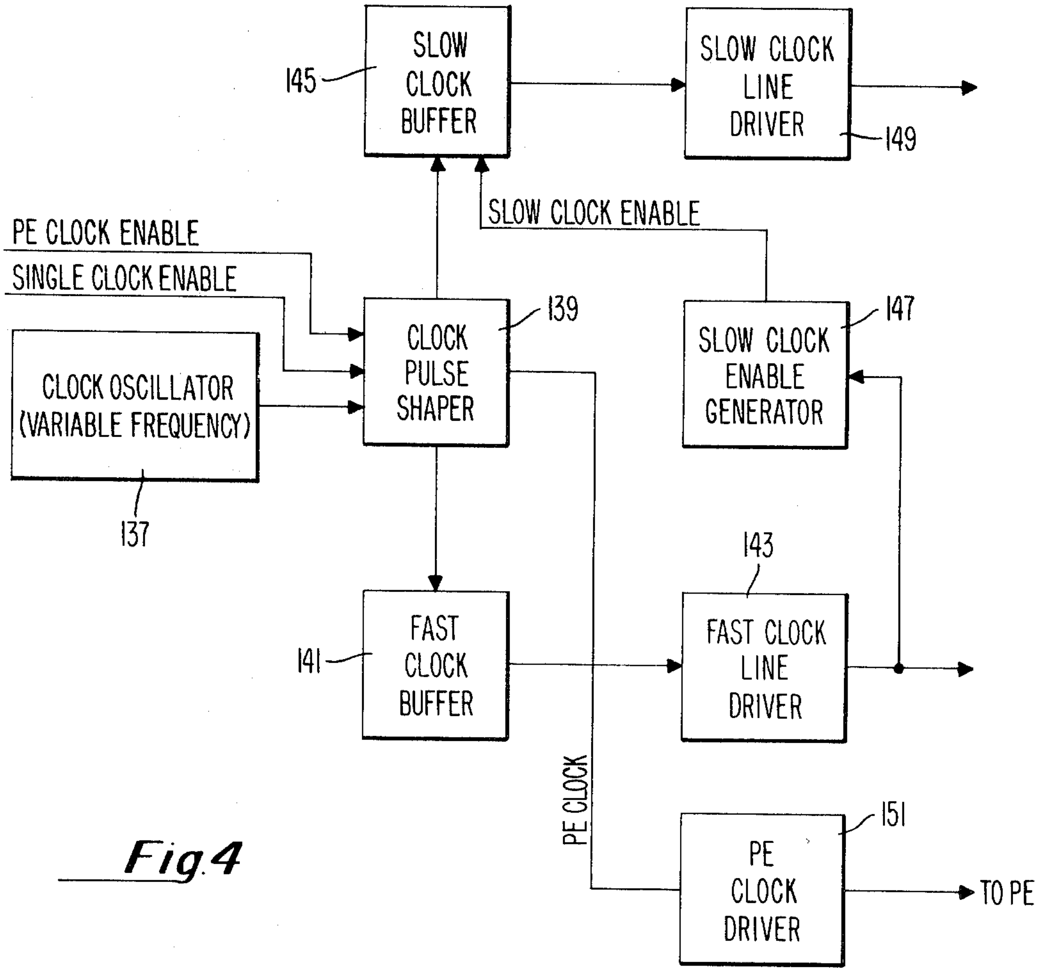
FIG. 4 is a block diagram of the circuitry used to generate the clock pulses for the apparatus.

The fast and slow clocks may be generated by the circuit of FIG. 4 of the drawings. The variable Frequency Clock Oscillator 137 generates a 25 MHz pulse train which is shaped in the Clock Pulse Shaper 139. From the Clock Pulse Shaper 139 the fast clock is buffered in the Fast Clock Buffer 141 and transmitted to the portions of the apparatus of FIG. 1 operating at the fast clock rate through the Fast Clock Line Driver 143.

The Slow Clock Buffer 145 receives as inputs the fast clock pulse output of the Clock Pulse Shaper 139 and a slow clock enable signal from the Slow Clock Enable Generator 147.

The Slow Clock Enable Generator 147 receives as an input the fast clock from the Fast Clock Line Driver 143 and generates a slow clock enable signal output on every 16th fast clock pulse input. The slow clock enable signal operates to gate every 16th fast clock pulse through the Slow Clock Buffer 145 to the Slow Clock Line Driver 149 to form the slow clock signal. From the Slow Clock Line Driver 149 the slow clock is transmitted to the portions of the apparatus of FIG. 1 operating at the slow clock rate.

The PE clock is generated by the Clock Pulse Shaper 139 at the same frequency and phase as the fast clock and transmitted to the PE through the PE Clock Driver 151.

The PE Clock is generated only while the sets of enabling signals are being read from the Memory 87 into the Command Register 91. At the same time that the Stepper Control Logic 129 sends a signal to the Active Command Address Register 95 to begin the reading of words from the Memory 87 it also sends a PE clock enable signal level to the Clock Pulse Shaper 139 to have it begin generating the PE clock. When the Active Command Address Register 95 signals the Stepper Control Logic 129 that it is finished transmitting the sets of enable signals to the PE, the Stepper Control Logic 129 removes the PE clock enable signal level from the Clock Pulse Shaper 139 to halt its generation of the PE clock.

The frequency of the Clock Oscillator 137 is made variable so that the operation of the component may be tested at other frequencies both above and below the design frequency of 25 MHz. There is also a Single Clock Enable input to the Clock Pulse Shaper 139 which allows the operator to stop the apparatus and the component manually through a test from the Control Panel one clock at a time.

Any number of test may be run consecutively on a PE during a testing operation and the program for running all of the tests may be placed in a single punched tape or card deck. If it is desired to run only one or a portion of the test it is possible to do this by loading the Test Number Register 133 from the Control Panel with the proper Test Number. The Reader Control Unit 59 will then ignore the other tests.

Although the apparatus of this invention has been described in terms of its usefulness in testing a PE of an array computer, it should be clear that, with minor modifications within the scope of the invention, it may also be used for operationally testing other components of data processing systems. It should also be clear that the bit length of the sets of enable signals and data words is dependent on the requirements of the component being tested and that they may be enlarged or made smaller. The Memory 87 and associated registers must also be modified in such a case.

What I claim is:

1. Apparatus for operationally testing a program controlled unit of a data processing system comprising;

memory means for storing sets of command signals to be transmitted to the unit under test, means for reading said sets of command signals from said memory means and for transmitting them to said unit in a set by set fashion for enabling the desired portions of said unit in the desired order, reader control means for reading information for running a test from an information input means and for distributing said information to the proper portions of the apparatus, means for initiating a running of the test after said reader control means has finished distributing the information for running the test and for executing an instruction after said reading and transmitting means has transmitted all the sets of command signals to said unit under test, output means for storing and transmitting at least one data word to a portion of said unit at a selectable time during the running of a test, and input means for receiving and storing a data word from said unit under test and for comparing said input data word with an expected value, said reading and transmitting means including, means for sequentially reading the sets of command signals from said memory means, register means for storing the last set of command signals read from said memory means, and means for halting the reading from said memory means at a selected set for a selected amount of time.

2. Apparatus for operationally testing a program controlled unit of a data processing system comprising;

memory means for storing sets of command signals to be transmitted to the unit under test, means for reading said sets of command signals from said memory means and for transmitting them to said unit in a set by set fashion for enabling the desired portions of said unit in the desired order, reader control means for reading information for running a test from an information input means and for distributing said information to the proper portions of the apparatus, means for initiating a running of the test after said reader control means has finished distributing the information for running the test and for executing an instruction after said reading and transmitting means has transmitted all the sets of command signals to said unit under test, output means for storing and transmitting at least one data word to a portion of said unit at a selectable time during the running of a test, and input means for receiving and storing a data word from said unit under test and for comparing said input data word with an expected value, said output means including, register means for storing at least one data word for transmission to the unit under test, plural output path driver means having outputs connectable to selected portions of said unit, output select means for selecting a particular output path of said plural output path drivers, and timing means for causing at least one data word to be transmitted to the portion of the unit under test selected by said output select means at a selectable time after the beginning of the running of the test.

3. Apparatus for operationally testing a program controlled unit of a data processing system comprising;

memory means for storing sets of command signals to be transmitted to the unit under test, means for reading said sets of command signals from said memory means and for transmitting them to said unit in a set by set fashion for enabling the desired portions of said unit in the desired order, reader control means for reading information for running a test from an information input means and for distributing said information to the proper portions of the apparatus, means for initiating a running of the test after said reader control means has finished distributing the information for running the test and for executing an instruction after said reading and transmitting means has transmitted all the sets of command signals to said unit under test, output means for storing and transmitting at least one data word to a portion of said unit at a selectable time during the running of a test, and input means for receiving and storing a data word from said unit under test and for comparing said input data word with an expected value, said input means including, register means for storing the data word received from said unit under test, multi-input path receiver means for receiving said data word from a selectable portion of said unit and for inserting said data word into said register means, input select means for selecting one of said input paths, and input timing means for enabling said input register to receive said data word from said unit under test at a selectable time after the beginning of the running of said test.

4. Apparatus for operationally testing a program controlled unit of a data processing system comprising;

memory means for storing sets of command signals to be transmitted to the unit under test, means for reading said sets of command signals from said memory means and for transmitting them to said unit in a set by set fashion for enabling the desired portions of said unit in the desired order, reader control means for reading information for running a test from an information input means and for distributing said information to the proper portions of the apparatus, means for initiating a running of the test after said reader control means has finished distributing the formation for running the test and for executing an instruction after said reading and transmitting means has transmitted all the sets of command signals to said unit under test, output means for storing and transmitting at least one data word to a portion of said unit at a selectable time during the running of a test, and input means for receiving and storing a data word from said unit under test and for comparing said input data word with an expected value, said reader control means including, input buffer register means for receiving the information for running a test from said information input test means in the form of a series of groups of multibit characters, the first character in any group being a tape command which contains an operation code specifying the significance of the information contained in the group, and the second character of any group being a character count which indicates the number of characters in the group, tape command register means for storing the operation code of the tape command received from said input buffer register means, character counter means for receiving and down counting the character count received from the input buffer register means and decoding means for decoding the contents of said tape command register means and said character counter means for distributing the information in the group of characters in accordance with the operation code of the tape command.

5. The apparatus of claim 4 wherein said reader control means further includes, means for determining whether the series of groups of characters being received by the input buffer register means is for the next test to run by said apparatus.

6. Apparatus for operationally testing a program controlled unit of a data processing system comprising;

memory means for storing sets of command signals to be transmitted to the unit under test, means for reading said sets of command signals from said memory means and for transmitting them to said unit in a set by set fashion for enabling the desired portions of said unit in the desired order, reader control means for reading information for running a test from an information input means and for distributing said information to the proper portions of the apparatus, means for initiating a running of the test after said reader control means has finished distributing the information for running the test and for executing an instruction after said reading and transmitting means has transmitted all the sets of command signals to said unit under test, output means for storing and transmitting at least one data word to a portion of said unit at a selectable time during the running of a test, and input means for receiving and storing a data word from said unit under test and for comparing said input data word with an expected value, said initiating and executing means including, register means for storing the instruction to be executed after all the sets of command signals have been transmitted, repeat counter means for indicating the number of times a test is to be repeated if repetition of the test is specified by the instructions in said register means, and logic means for decrementing the contents of said repeat counter means after each repetition of a test.

7. Apparatus for performing a plurality of operational tests on a component of a data processing system, said component being operated at a first clock rate, comprising:

means for storing sets of enable signals and for transmitting them in a set by set fashion to said component at the first clock rate for enabling the various portions of said component in a desired order to perform an operation on data with said component, output means for storing a data word and for transmitting said data word to said component under test at a selectable time after the beginning of the transmission of said sets of enable signals to said component, input means for receiving a data word from said component under test and for comparing said input data word with an expected value, means for reading information to run a test from an information input means and for distributing said information to the proper portions of said apparatus said reading and distributing means operating at a second clock rate, and means operating at said first clock rate for initiating the transmitting of the sets of enable signals to said component after said reading means has finished distributing the information to run the test and operating at the second clock rate to execute an instruction after said storing and transmitting means has finished transmitting said sets of enable signals to said component.

8. The apparatus of claim 7 wherein said storing and transmitting means includes:

a memory for storing said sets of enable signals, register means, memory addressing means for sequentially reading said sets of enable signals out of said memory into said register means at said first clock rate, means for halting for a selectable number of first clock times the reading from said memory after a selectable of one of said sets of enable signals is read into said register means.

9. The apparatus of claim 7 wherein said reading and distributing means includes:

input buffer register means for receiving the information for running a test from said information input means in the form of a series of groups of multibit characters, the first character in any group being a tape command which contains an operation code telling the significance of the information contained in the group, and the second character of any group being a character count which indicates the number of characters in the group, tape command register means for storing the operation code of the tape command received from said input buffer register means, character counter means for receiving and down counting the character count received from the input buffer register means, and decoding means for decoding the contents of said tape command register means and said character counter means for distributing the information in the group of characters in accordance with the operation code of the tape command.